United States Patent [19]
Villani et al.

[11] 3,888,691
[45] June 10, 1975

[54] POROUS CERAMIC

[75] Inventors: Vincent Villani, Tujunga; Ronald L. Topp, Poway, both of Calif.

[73] Assignee: Lockheed Aircraft Corporation, Burbank, Calif.

[22] Filed: Oct. 6, 1972

[21] Appl. No.: 295,608

[52] U.S. Cl. ............... 106/40 V; 106/40 R; 106/65; 106/73.4
[51] Int. Cl. ............................................. C03c 11/00
[58] Field of Search .......... 106/40 R, 40 V, 64, 104, 106/65, 73.4; 161/DIG. 5; 264/43; 65/22

[56]  References Cited
UNITED STATES PATENTS

| | | | |
|---|---|---|---|
| 3,253,936 | 5/1966 | Weindel | 106/64 |
| 3,256,105 | 6/1966 | Alford | 106/40 R |
| 3,690,904 | 9/1972 | Spangler | 106/104 X |

OTHER PUBLICATIONS

Chemical Engineer's Handbook, 3rd Edition, (1950), p. 963, TP155 P4 1950.

Primary Examiner—Winston A. Douglas
Assistant Examiner—John F. Niebling
Attorney, Agent, or Firm—Billy G. Corber; Lowell G. Turner; Edward D. O'Brian

[57]  ABSTRACT

Porous, lightweight ceramic bodies having a comparatively high strength per unit of weight may be created by first preparing a mixture of hollow glass spheres, a castable ceramic composition including ceramic particles and a binder for such particles and a lubricant such as water, then casting such a mixture to a desired configuration, then allowing the mixture to set up through the action of the binder so as to form a unitary body, and then removing the lubricant from the body. If the binder used has adequate strength characteristics the body created in this manner may be directly employed. If such a binder does not have such characteristics the body may be fired so as to bond the ceramic particles together. Preferably such particles are of a lithium-aluminum silicate composition which will take up into its internal structure the glass within the spheres upon firing.

4 Claims, 2 Drawing Figures

---

FORMING A MIXTURE OF HOLLOW GLASS SPHERES AND OF A REFRACTORY COMPOSITION INCLUDING REFRACTORY PARTICLES AND A BINDER FOR SAID PARTICLES, SAID SPHERES HAVING A MELTING TEMPERATURE LOWER THAN THE MELTING TEMPERATURE OF THE PARTICLES.

↓

FORMING A SOLID BODY FROM THE MIXTURE

↓

HEATING THE BODY AT BELOW THE SOFTENING TEMPERATURE OF THE REFRACTORY PARTICLES AND ABOVE THE MELTING TEMPERATURE OF THE GLASS WITHIN THE SPHERES SO AS TO CAUSE THE GLASS WITHIN THE SPHERES TO BE DRAWN INTO THE COMPOSITION.

Fig. 2

FORMING A MIXTURE OF HOLLOW GLASS
SPHERES AND OF A REFRACTORY COMPOSITION
INCLUDING REFRACTORY PARTICLES AND A
BINDER FOR SAID PARTICLES, SAID SPHERES
HAVING A MELTING TEMPERATURE LOWER THAN
THE MELTING TEMPERATURE OF THE PARTICLES.

↓

FORMING A SOLID BODY FROM THE MIXTURE

↓

HEATING THE BODY AT BELOW THE SOFTENING
TEMPERATURE OF THE REFRACTORY PARTICLES
AND ABOVE THE MELTING TEMPERATURE OF THE
GLASS WITHIN THE SPHERES SO AS TO CAUSE
THE GLASS WITHIN THE SPHERES TO BE DRAWN
INTO THE COMPOSITION.

POROUS CERAMIC

CROSS-REFERENCE TO RELATED APPLICATIONS

Earl G. Spangler U.S. Pat. application Ser. No. 21,361, filed Mar. 20, 1970, entitled "Ceramics Produced from Spodumene, Petalite and Clay," now U.S. Pat. No. 3,690,904 issued Sept. 12, 1972.

BACKGROUND OF THE INVENTION

For reasons which are unimportant to an understanding of the present invention, it is frequently necessary and/or desirable to utilize porous ceramic bodies having a comparatively high strength per unit of weight in many different applications.

The prior methods of forming and utilizing such bodies have been relatively unsatisfactory for anyone of a variety of different reasons. This can be illustrated by referring to the utilization of porous refractory bodies to back up relatively imporous ceramic tool faces in tools utilized in shaping certain types of metals at relatively high temperatures. In the past, preformed blocks of porous ceramics have been cut and shaped and then laid up through the use of appropriate cements of a mortar-like character to form such bodies.

These procedural steps have been both expensive and time-consuming. It is also considered that structures resulting from them tend to be somewhat undesirable. To a large extent these procedural steps have been necessitated because of a lack of a suitable castable composition capable of being easily and conveniently cast by an average user into a desired ultimate configuration. This is, of course, related to prior techniques which have been utilized in creating porous ceramic articles.

To a degree, any ceramic body directly created by bonding individual ceramic particles together will create a porous article. Thus, for example, any body made by mixing together ceramic particles and a binder and then casting such a mixture is somewhat porous in character. The degree of porosity with which this invention is concerned is much greater than the degree of porosity obtainable by these and similar techniques involving merely pressing particles together and then sintering or firing them so as to bond the individual particles to one another.

In the past, it has been proposed to create relatively porous ceramic bodies having separate pores by incorporating within either such a castable mixture or within particles to be pressed together what may be considered as "removable" type particles. Normally such particles have been common sawdust or other similar particles capable of being driven out of a ceramic at the elevated temperatures utilized in firing the ceramic. It has also been proposed to utilize particles of materials capable of being melted out of such ceramics, particles capable of being leached out of such ceramic and particles capable of being chemically reacted so as to be removed from such ceramics. Procedures of this type produce so-called open cell structures which are considered disadvantageous in that they are capable of taking up liquid during handling, use or the like and in that they are considered to not uniformly have consistent comparatively high strength to weight ratios because of the porous structures within them.

It has also been proposed to form porous ceramics by making up mixtures of ceramic particles, one or more binders, and one or more lubricants such as water with surfactants, foam stablizers or the like and preparing froths from such mixtures by entraining air within them. During techniques of this type, such a mixture is cast to a desired configuration and then is allowed to set to form a unitary body. It has also been proposed that to create porous ceramics by incorporating within castable slurries of them chemical gassing agents which will produce gas bubbles during the setting of such mixtures into a final ceramic body. With both of these techniques it is, or course, necessary to remove from such a body entrained liquid which might serve to cause physical breakdown due to rapid vaporization upon the heating.

As a result of the physical limitations of these methods, most firms desiring to utilize porous ceramic bodies have purchased such bodies from firms specializing in their manufacture and then have utilized such bodies in methods as indicated in the preceding. Not only have these methods been considered unsatisfactory from a utilitarian standpoint, but they are also considered to be unsatisfactory because of the nature of the pores created in them in a ceramic body. In such a body a comparatively high strength per unit of weight is usually or normally desired because of practical and/or physical considerations. It is considered that maximum strength per unit weight ratios require that the separate, discrete pores in a ceramic body be of a uniform spherical shape. It is to be emphasized that such pores differ in kind from the usually not separate and discrete pores formed in virtually any non-glassy type ceramic. These last pores are usually of an unavoidable character and usually result from inherent limitations of manufacturing processes.

These factors are considered to establish that there is a need for improvement in the field of porous ceramic bodies or compositions. More specifically it is considered that there is a need for compositions which are capable of being easily and conveniently cast to a desired monolithic final shape by a user of a porous ceramic body. It is also considered that there is the need for new and improved porous ceramic bodies as indicated and in particular for porous refractory type ceramic bodies which can be easily and conveniently formed so as to be of a closed cell type of character and so as to have comparatively high strength per unit of weight ratios.

SUMMARY OF THE INVENTION

A broad objective of the present invention is to fulfill these needs. More specifically the invention is intended to provide new and improved castable compositions which can be utilized easily and conveniently in creating comparatively lightweight, comparatively strong porous ceramic bodies. A further objective of the invention of a realted character is to provide bodies as can be created from such compositions which have comparatively high strength to weight ratios and which are of a type of comparatively closed cell character.

In its more specific aspects, the invention is primarily concerned with so-called high temperature or refractory type porous ceramic articles which are created utilizing refractory particles secured or bonded together in such a manner that they are located in a rigid structure capable of withstanding the temperatures normally applied to refractories in various operations such as metal forming operations and the like. Preferably these particles are of a nature as hereinafter indicated enabling them to take up into their internal structure in a final body or articles a glass composition so that an ultimate article or body created in accordance with this invention contains essentially smooth, somewhat porous walled spherical pores surrounded by a ceramic structure of a somewhat vitrified character.

This latter is comparatively difficult to understand without an understanding of the present invention. In accordance with this invention a mixture of hollow glass spheres, a castable ceramic composition including ceramic particles and a binder for such particles and a lubricant for the composition is prepared. Then such a mixture is cast to a desired configuration and is allowed to set up through the action of the binder so as to form a unitary body. The lubricant is then normally removed from the body.

If, because of the nature of the binder used, a body created in this manner has adequate strength characteristics so that it can be physically handled, this body may be directly employed in many applications. If the binder does not have such characteristics, the body may be fired so as to bond the ceramic particles together prior to use. When the particles are of a preferred refractory type composition either during the use of a previously unfired body at an elevated temperature or during such firing prior to use of the glass in the spheres will melt and will tend to be taken up into the internal structure of the ceramic particles so as to tend to form a somewhat vitrified or fused cell structure characterized by the absence of separate glass spheres in the final product.

BRIEF DESCRIPTION OF THE DRAWING

This invention is best more fully explained with reference to the remainder of this specification including the appended claims, and with reference to the accompanying drawing in which:

FIG. 2 is a diagrammatic flow sheet indicating the steps in a presently preferred method of forming such a porous ceramic.

Figure 1:
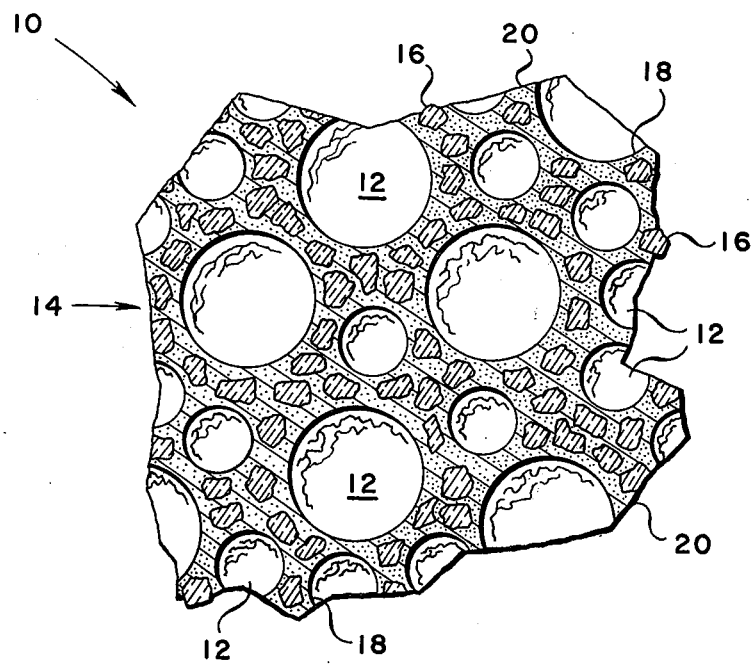
FIG. 1 is a diagrammatic cross-sectional view of a porous ceramic in accordance with this invention.

The accompanying drawing is primarily intended as an explanatory aid in indicating the nature of the present invention. To a degree this drawing indicates certain intangible concepts of the invention as fully defined by the accompanying claims. It will be realized that these intangible concepts can be utilized in various different manners in forming a wide variety of different structures without departing from the essential features of this invention.

DETAILED DESCRIPTION

As will be seen from an examination of FIG. 1 of the drawing, an ultimate porous ceramic of the present invention consists of a body 10 having separate internal spherical pores or cavities 12 which are largely or nearly all separated from one another by a matrix 14. This matrix 14 can be considered as a continuous matrix or matrix phase extending throughout the body 10. It is composed of individual ceramic particles 16 which are preferably graded as to size and which are bonded to one another. The surfaces 18 of the pores 12 are separated from one another and are contiguous with these particles 16 and are of a relatively smooth character having an inherent porosity corresponding to that of the matrix 14. The particles 16 may be secured in place by a binder 20.

These surfaces 18 preferably are composed of a mixture of the glass used in the beads to create the pores 12 and the ceramic material within the particles 16. In various ceramic bodies or articles created as herein described which have not been fired at an elevated temperature the hollow glass beads used in creating a body such as the body 10 will be present within the pores 12 and these surfaces will be of substantially the same character as the rest of the material within the matrix 14.

The method of creating a body such as the body 10 is by hindsight reconstruction relatively simple. In forming such a body, hollow glass beads such as are produced by several manufacturers are utilized. Such beads may vary in size from having an average diameter of approximately ⅝ of a inch down to an average diameter of approximately 250 microns. The size or sizes of the beads used for any particular ceramic will be dependent upon the properties desired in such a body. In general, a mixture of beads of various sizes corresponding to a mixture graded as to size as used in conventional concrete work is considered preferable for use in forming a porous ceramic in accordance with this invention in which a maximum degree of porosity is desired since beads graded as to size in this manner will tend to "pack" or fit together to a maximum extent within a given space.

Extensive studies have been devoted to determining size gradations which should be utilized in packing a maximum number of particles of various different sizes in a given volume. It is not the function of this specification to repeat and/or summarize the results of such studies. It is considered that effective results can be achieved utilizing a mixture of beads of different sizes such that from about 40% to about 75% of such beads by volume are of one size and the remainder of such beads are of a size having at least half of the diameter of the larger beads. A mixture of this type seems to "pack" well and to have desired physical properties.

In creating porous ceramics it is desirable that the pores be of sufficiently small in size so as to minimize the possibility of localized weak areas at a surface of a fired article or body. It is also desired that the pores by sufficiently large so that they can satisfactorily be utilized in cutting down heat transmission. These practical considerations are considered to make it preferable to utilize glass beads with this invention which are no greater than 4 mesh Standard Tyler screen size in diameter and which are no smaller than 200 mesh Standard Tyler screen size in diameter.

For relatively critical applications where strength considerations are considered to be quite important it is presently believed that most satisfactory results can be achieved utilizing glass spheres about 40 to about 80% by weight of which are of a −4 to a +12 mesh standard Tyler screen size, about 0 to about 30% by weight of which are of a −12 to a +30 mesh standard Tyler screen size and from about 20 to about 60% by weight of which are of a −32 to a +200 mesh standard Tyler screen size. It will be recognized that useable, effective porous ceramics can, however, be created using glass spheres of other sizes and in other proportions.

It is not considered that the composition of the beads used is of an extremely critical manner so long as these beads are created from a conventional glass composition. Preferably, however, these beads are of a lime-soda type glass having a melting point below the melting point of the ceramic particles with which they are to be used and are of such a chemical character that their components are capable of entering into the chemical structures of the ceramic particles in a ceramic article as herein described as such an article is fired or heated at an elevated temperature.

From this it will be apparent that the glass composition used in the beads should be correlated with the nature of the ceramic particles used. Because this invention is primarily intended to fulfill a need in the field of refractory type ceramics for porous ceramic bodies useable in high temperature forming dies, it is preferred that the ceramic particles used be refractory particles. Normally such particles will be of an irregular shape. This is preferred since it tends to promote this intercooking together in a fired ceramic body or article. This term "refractory" is a relatively indistinct term.

This term is used herein to designate particles of material which do not noticeably soften or deteriorate when heated at prolonged periods at temperatures of 1,600°F. It is noted that there are many such materials. Amongst such materials are alumina, zirconia, zircon, fused silica, magnesia, spinel, chromite, bauxite, fired clay, silicon carbide and the like. Mixtures of these and similar materials can be employed if for some particular reason this is desired.

It is, however, preferred to utilize with the present invention particles of a lithium-aluminum silicate refractory composition having a zero of substantially zero coefficient of temperature caused expansion so as to minimize the possibility of a final porous ceramic body or article cracking due to temperature caused stresses and strains. The aforenoted Spangler U.S. Pat. entitled, "Ceramics Produced from Spodumene, Petalite and Clay" discloses ceramic particles having these desired characteristics. Other similar lithium-aluminum silicate type particles as can be created by firing mixtures of clay and lithium-aluminum silicate minerals such as spodumene and petalite are considered to be nearly as effective as ceramic particles set forth in this patent.

These lithium-aluminum silicate refractory particles have another distinct advantage with the present invention. Because of their chemical structure they can take up into their crystalline structure glasses having lower melting or softening points then their softening melting points, without significantly affecting their physical expansion characteristics. This is important in preserving a low or nearly zero temperature coefficient of expansion in a high temperature metal working or similar die or structure.

It also is important in that during the absorption of a glass composition there is a tendency for the refractory material to form with the glass composition an essentially smooth wall type of vitrified surface structure such as the surfaces 18 surrounding the areas originally occupied by the glass beads used. Such wall structures are considered desirable in obtaining relatively high physical strength characteristics. This can be readily realized by considering that sharp corners, discontinuities and the like uniformly give rise to stress points in structures where failure is apt to occur as a result of the application of physical forces.

A binder is utilized with ceramic particles as indicated in order to secure or hold these particles together in a comparatively rigid or solid structure after a mixture as described in the preceding discussion has been created and cast to a desired configuration. The nature of the binder used will normally depend upon the application of the final porous ceramic body or article to be created and the nature of the particles being bonded together. Any binder to be used, thus, serves to at least temporarily secure these particles into a unitary article which can either be used directly or which has adequate strength so that it can be subsequently fired to a unitary useable article.

From this it will be apparent that within the broad concept of the invention virtually any type of conventional binder material can be utilized. However, for high temperature utilizations it is preferred to use binders which are acceptable from a high temperature standpoint in that they will withstand such temperatures without deterioration and/or will not interfere with direct bonds being obtained between the refractory particles used. If desired, such binders may be referred to as refractory or refractory-type binders.

A particularly suitable binder composition for use with the present invention is a conventional calcium aluminate cement. Such calcium aluminate cements are commercially available. At times, they are referred to as aluminuous cements. It is well known that such calcium aluminate type compositions will hydrate to form normal Portland cement type bonds at relatively low temperatures and that upon heating to moderate temperatures within a refractory range as indicated that these hydrates will serve to exert a bonding function even though the temperatures encountered will remove water of hydration from them. There are a number of other closely similar cements such as barium aluminate cements corresponding to calcium aluminate cements which are considered to be applicable to the present invention.

These calcium aluminate or aluminuous cements will provide upon setting a unitary body which is sufficiently strong so that such a body can frequently be utilized directly without being preheated. Thus, during the heating of a refractory composition as indicated which has been directly cast utilizing such a binder during utilization of such a body or article will have the effect of firing the article. It is, however, possible and for some applications desirable to utilize binders which give what may be referred to as low green strengths in bodies as herein described, but which contribute materially to the ultimate strengths of such bodies after they have been fired to temperatures as described herein as refractory temperatures.

As an example of this, it is possible to utilize such compositions as colloidal silica, colloidal alumina and colloidal lithium polysilicate binders as are commercially available. As supplied, these binders may either be dry or may contain a significant portion of water. Binders of these types are considered preferable for use with lithium-aluminate silicates as indicated inasmuch as during firing they will tend to enter into the crystalline structures of such silicates without materially altering the temperature coefficients of expansions of these silicates. With a colloidal silica binder it is considered advisable that any ultimate article not be fired above the well known silica inversion temperature and that such a fired article be utilized below this temperature in order to minimize any possibility of silica inversion causing internal stresses and strains which might tend to disrupt the physical properties of the final product.

It is normally preferred to utilize a mixture of two different types of binders having different properties. A mixture of a colloidal binder such as a colloidal silica binder and a cement such as calcium aluminate is normally preferred because these two types of binders have different expansion characteristics and because they contribute strengths at different time periods related to the firing of an article for refractory use. Thus, a cement as indicated has a negative expansion coefficient while a colloidal binder as indicated has a positive expansion coefficient. Such a cement will give a relatively high initial strength prior to firing while a colloidal binder as indicated will give a rather high strength after firing or heating. It is considered that best results consistent with the useable internal strengths and consistent with desirable fired strengths in a final fired body can be achieved using a mixture of from about 25 to about 75% by weight on a dry basis of either of these types of binders and the balance of the other of these types of binders.

The proportions of the binders used may be varied within comparatively wide limits. In general, just sufficient binder should be used so that any cast unitary body created in accordance with this invention will have a necessary physical strength to withstand handling and the like prior to either firing or use. In general, it is considered that no more of the binder should be used than is reasonably necessary to make sure that such a physical strength is achieved. The amount of the binder required will depend somewhat upon the nature and the sizes of the ceramic particles employed. In general satisfactory results can be achieved when the dry binder solids are in the range of from about 15 to about 30% by weight of the total weight of the ceramic particles (but not the glass spheres) used.

For desired strength characteristics it is desired that the ceramic particles employed will "pack" the spaces between the individual spheres used as effectively as reasonably possible so as to avoid the presence of any significant porosity or voids between these spheres. For this reason the sizes of the ceramic particles used should preferably be proportioned between comparatively large particles and comparatively small particles as indicated in the preceding discussion. It is considered that satisfactory results can be achieved uniformly when from about 40 to about 75% by volume of such particles are of one diameter and the remainder of such particles are of at least half of this same diameter.

These particle sizes may be the same or nearly the same as the sizes of the glass spheres employed. Thus, it is considered that these particles should preferably be from −4 to +200 mesh standard Tyler screen size. It is presently considered that preferred results can be achieved by using ceramic particles proportioned so that from about 40 to about 80% by weight of such particles are −4 to +12 mesh standard Tyler screen size, from about 0 to about 30% by weight of such particles are from a −12 to a +30 mesh standard Tyler screen size and from about 20 to about 60% by weight of such particles are from a −32 to a +200 mesh standard Tyler screen size. Here again, acceptable results for most purposes can be achieved if there are reasonable deviations from these ranges.

Frequently the castable ceramic composition used with the invention will be supplied in the form of a dry mixture to which water is added to act as a lubricant and to serve to "activate" the binder employed. When a colloidal binder such as colloidal silica is used with a cement this binder is preferably added while stirring or blending to a mixture of water, the ceramic particles and the cement to make up a uniformly mixed slurry of a castable mortar type consistency to minimize any tendency for gel formation. An amount of mortar should be used which is sufficient so that the mortar will have a consistency roughly comperable to that of a "thick" dish of breakfast cereal known as "Cream of Wheat." Normally the glass spheres used will be added to this mixture in an amount necessary so that these spheres are completely coated or covered by the mortar-type composition. If desired, however, the spheres can be mixed with dry particles prior to the addition of any water liquid binder.

If an amount of the spheres is used which is in excess of about 70% by volume of the volume of the solids in the martar or castable composition it is considered that the spheres will tend not to be spaced sufficiently from one another in a final article or body for such an article or body to have normally desired strength characteristics after it is fired. Similarly it is considered that if the weight of the spheres is greater than about 50% of the weight of the binder—refractory solids—mixture on a dry-weight basis that an article or body created as herein described will not have normally adequate or satisfactory strength characteristics regardless of whether it is used under such conditions that it is fired or not.

The relative proportion of glass spheres to be utilized in a castable composition as indicated is essentially a matter of choice depending upon the strength characteristics desired in an article. In general, the higher the proportion of spheres the greater the extent to which the strength of the final article in accordance with this invention is decreased. If no spheres are used obviously the benefits of a structure as indicated are not achieved. Because of this, in order to obtain the benefits of the invention it is considered necessary to use an amount of the spheres equal to at least about 30% by volume of the volume of the solids in the mortar or castable composition employed.

Such spacing is considered necessary in developing maximum strength per unit weight characteristics. As indicated in the preceding the spheres should be spaced from one another in a continuous matrix serving as a continuous phase separating the spheres and/or the pores 12 corresponding to them. When the spheres and/or pores are separated in this manner there is a relative absence of internal sharp corners or points within a body such as the body 10. Such absence is considered to be significant in a structure of the invention having a relatively high strength to weight ratio.

As indicated in FIG. 2 of the drawing a casting mixture as prepared from the various ingredients indicated is cast into a desired mold—preferably a mold having the shape of a final unitary body or article to be created. Such casting is normally carried out in such a way as to minimize the presence of air bubbles or other similar voids. Various conventional techniques such as vibration or tamping or pulling a vacuum can be used to minimize the presence of such air bubbles or similar voids. Then after the casting is completed the cast body material is allowed to set up into a "green" unitary structure or body.

When only a colloidal binder such as the colloidal silica indicated in the preceding is used, it is considered desirable to line the mold into which the composition is cast with a porous, water absorbent material such as paper or cardboard through which the surplus water in the cast composition may escape. It is also considered desirable to cover any exposed surface of a cast unit prepared in this manner with a similar material so that water will be drawn out of the colloidal binder at a controlled rate tending to minimize any tendency toward cracking. It is considered that conventional porous molds such as plaster molds are not suitable for use when only a colloidal binder is employed because the migration of this type of binder will tend to bond the cast article to such a mold as such an article is setting up.

With cement type binders or binder mixtures this expedient is not necessary since such binders will develop an initial green strength as a result of internal hydration after a period of time corresponding to a conventional cement setting time. Regardless of whether or not one type of binder or the other or both are used after an initial green strength has developed in accordance with recognized mechanisms over recognized periods, surplus or excess water should be removed from the cast unitary body relatively slowly so as to avoid the rapid expansion of this water as steam during heating since such expansion might break up the unitary article.

Such water removal may be accomplished in accordance with conventional practice. Normally a "green" unitary body as described will be air dryed for several days or perhaps longer if extremely large in size and then will be gradually heated at a rate no greater than an increase of about 100°F. per hour per inch of body or part thickness until the unitary body is brought up to a temperature at which it is to be used or slightly above.

Because of the nature of such heating it may be conveniently carried out in bringing a body or article having a desired green strength sufficient so that it may be easily handled under conditions up to the temperature at which it is to be used during or as a part of its intended utilization. This is considered to be a distinct advantage with porous ceramics of the present invention in certain applications since it avoids what may be regarded as an extra step of preheating or firing prior to the installation of an article or body in a location where it is to be utilized.

This initial heating of a green unitary body is also considered important in another regard. Glass compositions as are used in spheres as indicated in the preceding and as are employed with the invention will normally have a softening point within the range from about 1,000 to about 1,200°F. and will melt at a temperature of from about 1,400°F. to about 1,500°F. It will be recognized that such melting points are below what were indicated in the preceding as refractory temperatures. As a result of this as a body or article as described is raised to a refractory temperature these spheres will tend to soften and melt. When the refractory particles are lithium-aluminum silicates as indicated in the preceding, these glass compositions will appear to be taken up or drawn into the structures of such silicates so as to form surfaces such as the surfaces 18 during heating to such temperatures. It is considered that to a degree this "taking" up will occur with other refractories as a result of capillary action.

This will occur concurrently with colloidal binders such as colloidal silica binders being taken up these same structures. As the result of this, the individual pores 12 indicated in the preceding discussion will be created as smooth walled, substantially spherical pores. Since this taking up process is not considered to significantly affect the properties of these lithium-aluminum silicates the resultant fired or heated articles resulting will have physical properties which are primarily determined by these refractory particles and which are unaffected by internal discontinuities defining or surrounding the pores 12.

As a result of these considerations the preferred porous ceramics in accordance with this invention can be considered as particularly satisfactory refractory articles suitable for a wide variety of high temperature or refractory type used as in forming dies or the like. These ceramics may, however, be utilized in various applications in which the glass spheres used are not softened or melted because these structures are not heated to elevated temperatures as indicated. In structures or bodies which are not heated to the melting or softening temperatures of these glass spheres, these spheres serve as a light-weight reinforcing aggregate promoting desirable strength to weight ratios.

If a ceramic as described is utilized without the glass spheres employed having been melted, these ceramics are clearly of a closed cell character because the spheres themselves are closed. Those ceramics in accordance with the invention which have been heated so that these spheres are not present as separate distinct entities clearly contain separate and discreet pores or cells. Such pores or cells are spaced from one another. Because of this a fired ceramic in accordance with this invention can be considered essentially as a closed cell structure even though the pores or cells within it are in communication with one another to a degree because of the inherent porosity of the matrix material employed.

Such porosity of this material is considered to be essentially inherent to any conventional ceramic which has not been glazed or which is not of a glassy character. Thus, the fired ceramics of the present invention can be referred to as closed cell ceramics inasmuch as they deliberately create cells or pores in them which are not in communication with one another even though to a minor degree they are in communication because of the porosity inherent in the ceramic material employed.

In order to facilitate an understanding of this invention the following specific examples are given. It is understood that these examples of a related nature could be given so as to facilitate an understanding of the invention. For this reason, these examples are not to be considered as limiting the invention to any respect.

EXAMPLE 1

A dry mixture containing 20% by weight −200 mesh calcium-aluminate cement and 80% by weight particles of a lithium-aluminum silicate created by slip casting and firing and then grinding as indicated in the aforenoted Spangler U.S. Pat. No. 3,690,904 entitled "Ceramics Produced from Spodumene, Petalite and Clay" can be prepared. These particles should be graded as to size so that about 40% by weight of these particles are from a −4 to a +12 mesh standard Tyler screen size, 10% of such particles are from a −12 to a +32 mesh standard Tyler screen size and 40% by weight of such particles are from −32 to +200 mesh standard Tyler screen size. An amount of water approximately equaling 30% of the weight of the dry mixture can be added slowly to the dry materials as the composition is mixed so as to form a slurry. A mixture of glass spheres sold under the trademark CELRAMIC by Pittsburg Corning of One Gateway Center, Pittsburg, Pa., 15222 proportioned so that 50% of said spheres by weight are from −4 to +12 standard Tyler screen size, 10% by weight of such spheres are from −12 to +30 standard Tyler screen size and 40% by weight of such spheres are from −32 to +200 mesh standard Tyler screen size can then be mixed with the slurry. The amount of such spheres should be regulated so that only sufficient spheres are added so that all spheres are uniformly coated and covered by this slurry.

The resultant mixture can then be cast into a mold and held at a constant 100% humidity to prevent water loss for a period of 24 hours. At the end of this period a resultant body can be removed from the mold and heated at a temperature of about 200°F. for a period of 24 hours. Then the temperature of this article can be gradually increased at a rate of about 100°F. per hour inch of thickness until it is heated to a temperature of about 1,850°F. It can then be held at this temperature for a period of approximately four hours. An article produced in this manner can then be air cooled to room temperature.

EXAMPLE 2

To 80 parts by weight of lithium-aluminum silicate particles as indicated in the preceding example, 25 parts by weight of commercial colloidal silicate composition containing 30% by weight solids disbursed in water can slowly be added as the mixture is stirred. Additional water can then be added as the mixing is continued so as to form a thick slurry capable of being cast or poured. A mixture of glass spheres as indicated in the preceding example can be added as the slurry is stirred. Such spheres should be added until such time as by visual inspection it appears that if additional spheres were added that such spheres would not be completely coated or covered by this slurry.

The resultant mixture can then be cast into a plaster mold lined with thin unglazed cardboard and the surface of the composition in the mold can be covered with a sheet of the same material. This cast unit can then be dried in air at a temperature of about 150°F. for a period of four days. The resultant structure can then be removed from the mold and the cardboard and placed in a kiln at room temperature and heated at a temperature gradually increasing at a rate of about 100°F. per hour inch of thickness until a temperature of about 1,700°F. is reached. This temperature can then be held for a period of about 2 hours. At the end of this period the resultant article can be air quenched.

We claim:
1. An unfired porous ceramic composition having a comparatively high strength per unit of weight which comprises:
   a plurality of hollow glass spheres surrounded by and held separate and apart from one another in and by a continuous matrix phase of ceramic particles which are bonded to one another by an inorganic binder so as to encase and surround said spheres,
   both said spheres and said particles are no greater than about 4 mesh standard Tyler screen size in diameter and no smaller than about 200 mesh standard Tyler screen size.,
   from about 40 to about 75 percent of said particles by volume are of one size and the remainder of said particles are of a size having at least half of the diameter of the larger particles,
   from about 40 to about 75 percent of said spheres by volume are of one size and the remainder of said spheres are of a size having at least half of the diameter of the larger of said spheres,
   said matrix consists essentially of from about 15 to about 30 percent by weight of said inorganic binder for said particles and the remainder of said particles,
   said particles are irregularly shaped lithiumaluminum silicate particles having a melting temperature of at least 1,600°F,
   said glass spheres have a melting temperature which is lower than the melting temperature of said particles,
   said spheres constituting from about 30 percent to about 70 percent by volume of said body and constituting no more than about 50 percent by weight of the weight of said body,
   said refractory particles being capable of taking up the material within said glass into their structures upon heating of said body to at least the melting temperature of said glass spheres.
2. A ceramic body as claimed in claim 1 wherein: said binder is a calcium aluminate cement.
3. A ceramic body as claimed in claim 1 wherein: said binder is a colloidal silica binder capable of entering into the structures of said particles.
4. A ceramic body as claimed in claim 1 wherein: said binder consists essentially of from about 25 to about 75% by weight of a calcium aluminate cement and from about 25 to about 75% by weight of colloidal silica.

* * * * *